(12) United States Patent
Gloodt (10) Patent No.: US 8,414,169 B2
(45) Date of Patent: Apr. 9, 2013

(54) LICENSE PLATE ASSEMBLY SIMULATING FLAMES

(76) Inventor: Cary E. Gloodt, Burr Ridge, IL (US)

(*) Notice: Subject to any disclaimer, the term of this patent is extended or adjusted under 35 U.S.C. 154(b) by 0 days.

(21) Appl. No.: 12/756,408

(22) Filed: Apr. 8, 2010

(65) Prior Publication Data

US 2012/0002431 A1  Jan. 5, 2012

(51) Int. Cl.
  *B60Q 1/56* (2006.01)
(52) U.S. Cl.
  USPC ............................ 362/497; 362/498; 362/499
(58) Field of Classification Search ........... 362/497–499
  See application file for complete search history.

(56) References Cited

U.S. PATENT DOCUMENTS

| | | | |
|---|---|---|---|
| 6,547,410 B1 * | 4/2003 | Pederson | 362/35 |
| 7,118,256 B2 * | 10/2006 | Desmond et al. | 362/491 |
| 7,556,408 B2 * | 7/2009 | Thomson | 362/459 |

FOREIGN PATENT DOCUMENTS

JP  04218090 A * 8/1992

* cited by examiner

*Primary Examiner* — Robert May
(74) *Attorney, Agent, or Firm* — Brannon Sowers & Cracraft PC (57) ABSTRACT

An assembly for creating the appearance of flames emerging from a vehicle exhaust, including a partially transparent tube connected to the vehicle, a light emitting array positioned within the tube, a plurality of reflective generally flame-shaped streamers extending at least partially into the partially transparent tube, an air pressure source operationally connected to the tube, a power source electrically connected to the light emitting array and an electronic controller operationally connected to the light emitting array. Actuation of the air pressure source waves the streamers within the tube and the streamers are visible through the tube when waving. The light emitting array is positioned to shine light onto the waving streamers and the electronic controller is operable to sequence the actuation of the light emitting array.

7 Claims, 8 Drawing Sheets

LICENSE PLATE ASSEMBLY SIMULATING FLAMES

TECHNICAL FIELD OF THE INVENTION

The present invention relates generally to the field of automotive accessories and, more specifically, to a device for simulating the emission of flames from a vehicular exhaust.

BACKGROUND OF THE INVENTION

In the arena of show cars, there is an ever-increasing demand for new and different accessories. Especially favored are devices for providing aesthetic illumination to the vehicle. Some popular illumination accessories include neon lighting for the underbelly of the vehicle, neon detailing around the license plate, and pinpoint illumination of the wheels. One especially intriguing concept is the emission of flame from the automobile, ala television's Batmobile. While this effect may be achieved through the exhaust of still-burning gasses, obvious safety issues prohibit the use of this effect except under very tightly supervised conditions, thus rendering it inappropriate for display at car shows and especially inappropriate for private usage.

There is therefore a need for a vehicular lighting accessory for providing a flame-emission effect without the safety hazard associated with an open flame emerging from the vehicle. The present invention addresses this need.

SUMMARY OF THE INVENTION

The present invention relates to a method and apparatus for providing illumination to an automobile wheel having an at least partially transparent wheel covering. In one preferred embodiment, the apparatus includes a substantially hollow opaque cylinder with at least one open end mounted to a vehicle, a transparent tube connected to the at least one open end, a plurality of reflective streamers extending at least partially into the transparent tube, a lighting assembly positioned within the opaque cylinder, an electrical power source electrically connected to the lighting assembly, and means to wave the plurality of reflective streamers.

One object of the present invention is to provide an improved decorative illumination for an automobile. Related objects and advantages of the present invention will be apparent from the following description.

DESCRIPTION OF THE PREFERRED EMBODIMENTS

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

FIGS. 1A-7 illustrates a first embodiment of the present invention, a decorative lighting assembly 10 for use with a vehicle 5 such as an automobile, truck, motorcycle or the like, to simulate the appearance of flames emerging from an exhaust pipe. The lighting assembly 10 a generally cylindrical tube 12 having an opaque portion 14 and a transparent portion 16. The opaque portion 14 is preferably sized and colored to resemble a typical vehicular exhaust pipe. At least one, and preferably three to five, streamers 18 are connected within the tube 12. The streamers 18 are preferably flame-shaped and are more preferably connected at one end to cross struts 20 mounted within the tube 12 with the other end free to extend and wave in response to air flow over the streamer 18. The cross struts 20 are preferably mounted within the opaque portion 14 adjacent the transparent portion 16, such that the streamers 18 may extend for most of their length into the transparent portion 16. The cross struts 20 may be mounted in parallel (as shown) or may alternately have any non-parallel orientation as desired.

Figure 1A:
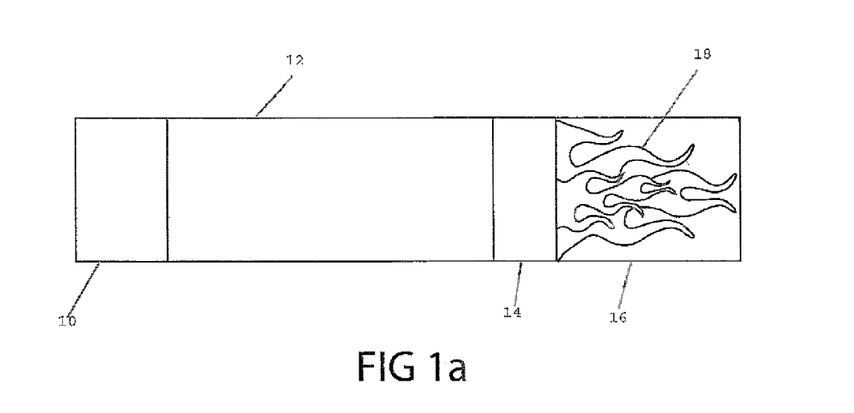
FIG. 1A is a schematic view of a first embodiment of the present invention, a vehicular lighting assembly for simulating the appearance of flames emerging from an exhaust pipe.
Figure 2:
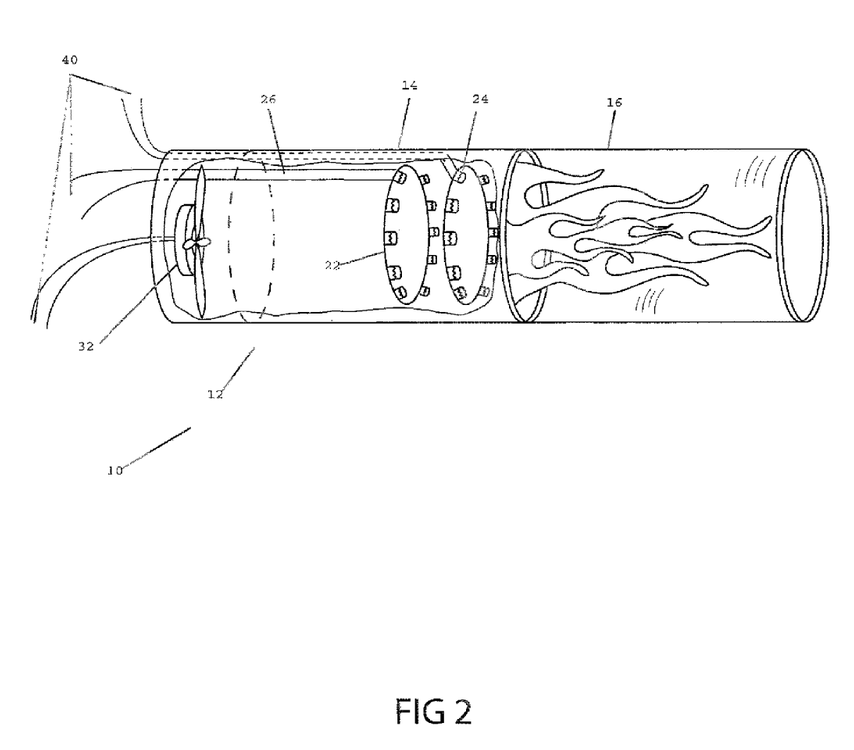
FIG. 2 is a partial cutaway perspective view of the embodiment of FIG. 1A.
Figure 3:
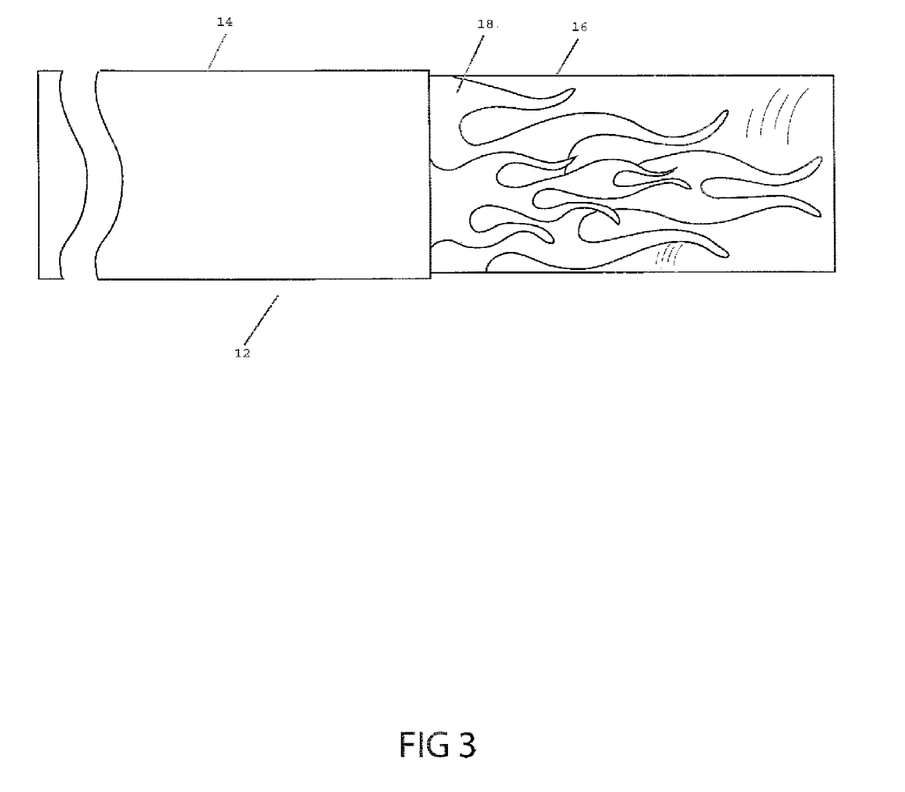
FIG. 3 is an enlarged partial cutaway perspective view of FIG. 2.
Figure 4:
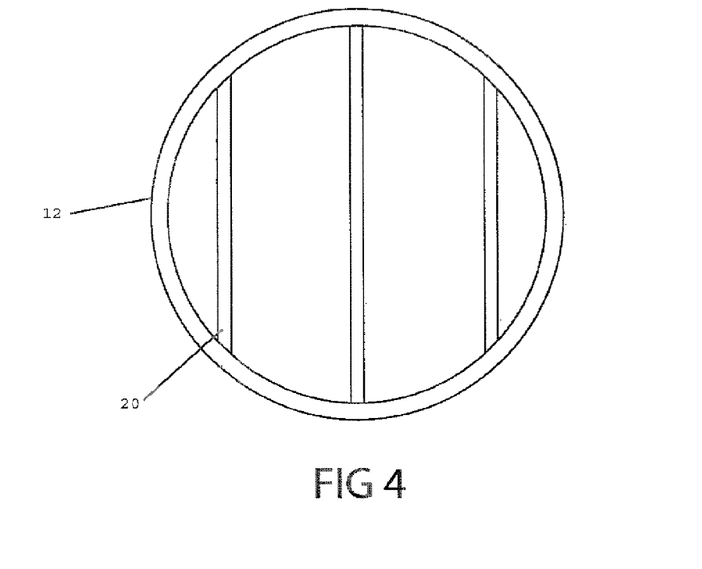
FIG. 4 is cross-sectional view of the embodiment of FIG. 3 along line A-A'.
Figure 5:
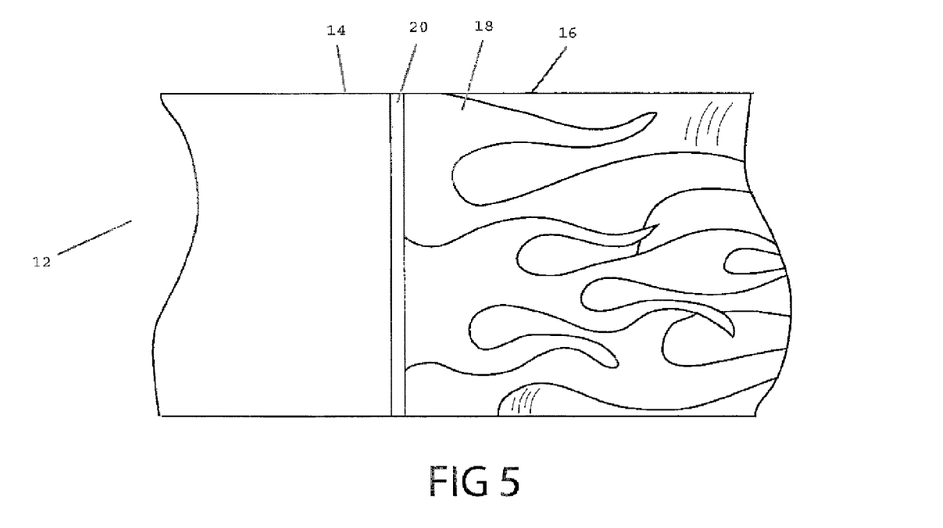
FIG. 5 is a partial perspective view of FIG. 3.
Figure 6:
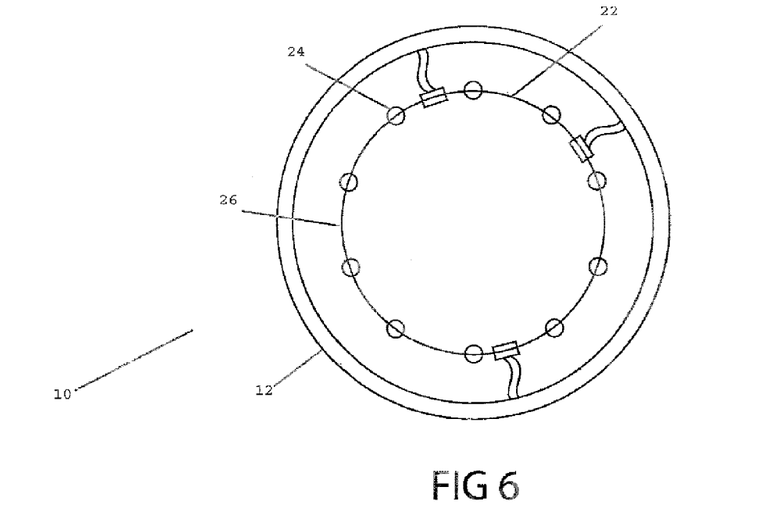
FIG. 6 is cross-sectional view of the embodiment of FIG. 3 along line B-B'.

A lighting assembly 22 is mounted within the tube 12 for illuminating the streamers 18. The lighting assembly 22 preferably includes a plurality of light emitting diodes (LEDs) 24 electrically connected via wires 26 to an electrical power source 28 (such as the vehicle's battery.) The LEDs 24 are preferably of different colors, and are more preferably primarily red, yellow and/or orange, although some or all of the LEDs 24 may be blue or violet (or any color) as desired. More preferably, some or all of the LEDs 24 may be of the triluminary or multicolored variety, able to generate three (or more) colors on demand. The wires 26 are preferably formed into a ring or other convenient shape that allows for the illumination of the streamers 18 when extended. The lighting assembly 22 is preferably mounted within the opaque portion 14 (more preferably with the struts 20 between the lighting assembly 22 and the transparent portion 16) and is preferably attached by one or more mounting members 30.

Figure 1B:
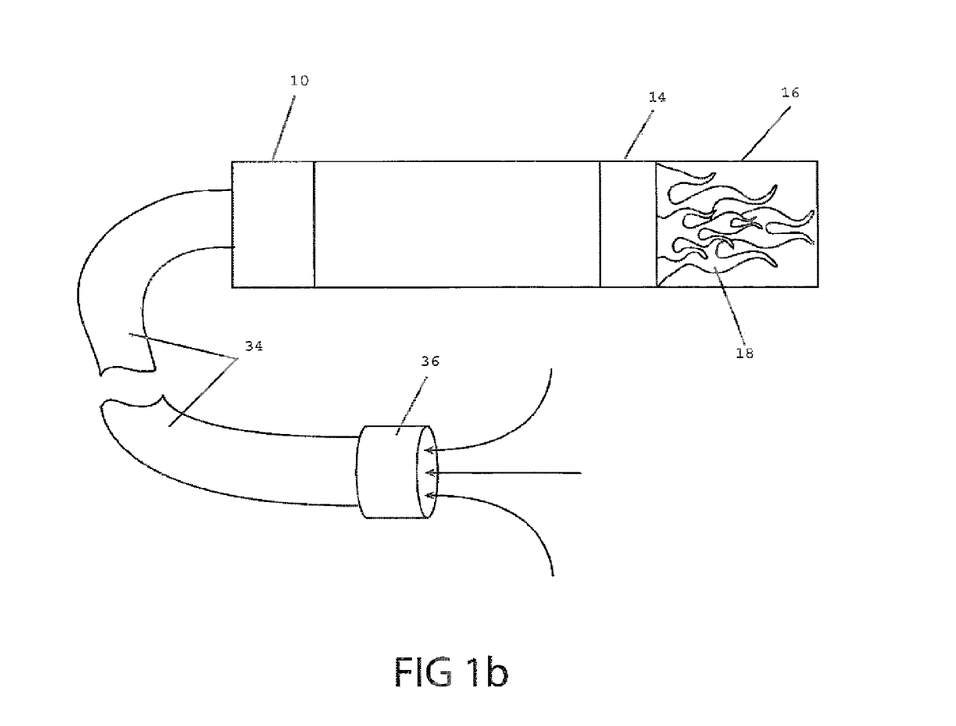
FIG. 1B is schematic view of a second embodiment of the present invention, similar to the embodiment of FIG. 1A but with the addition of an air intake hose connected to the assembly.
Figure 7:
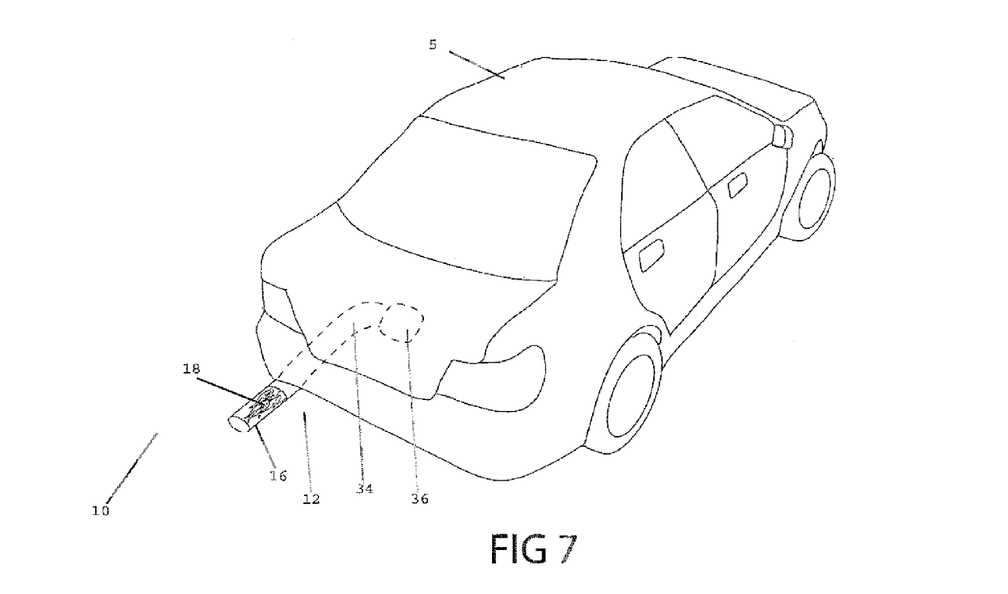
FIG. 7 is schematic view of the second embodiment of the present invention as mounted to an automobile.

An air pressure source 32 is pneumatically connected to the tube 12 such that actuation of the air pressure source 32 wavingly blows the streamers 18 into the transparent portion 16. In other words, the air moving over the streamers 18 causes the streamers 18 to extend into the transparent portion 16 and the turbulence of the airflow causes the streamers 18 to randomly oscillate (i.e., wiggle or wave.) The air pressure source 32 is preferably a small, high-speed fan mounted in the opaque portion 14 of the tube 12 and connected in electric communication with the power source 28. Alternately, as shown in FIGS. 1B and 7, the air pressure source 32 may include an air hose 34 connected between the tube 12 and a inlet 36 positioned in a relatively weather-protected portion of the vehicle 5, such as a, storage compartment, the passenger compartment, or the like, such that air drawn through the hose 34 would be free of moisture and/or pollutants. Still alternately, the air pressure source 32 may be a compressed air container pneumatically connected to the tube 12.

Preferably, the assembly 10 includes an electronic controller 40 operationally connected to the lighting assembly 22 and/or the air pressure source 32 for actuating/deactuating the same. Alternately, the lighting assembly 22 and/or the air pressure source 32 may be manually actuated/deactuated, such as by switches or the like operationally connected between the respective components 22, 32 and the power source 28. The electronic controller 40 may be programmed to actuate specific LEDs 24 as desired, actuate the LEDs 24 in specific (or random) patterns and/or at specific (or random) rates, vary the air flow provided by the air pressure source 32 (i.e., vary the fan speed), and the like.

As noted above, the light sources 24 are preferably high intensity LEDs, although any convenient light sources may be chosen. The LEDs 24 are preferably connected to the power source 28 in parallel, such that the failure of one LED 24 does not result in the failure of the entire lighting assembly 20. Also as discussed above, the lighting assembly 22 preferably includes one or more LEDs 24, and is more preferably an array of LEDs 24. Once actuated, light source 22 may shine continuously, or may flicker or strobe intermittently. If light source 22 is adapted to strobe, the strobing of light source 22 is more preferably timed such that the light reflected from the oscillating streamers 18 closely resembles flames. The mechanism for strobing the light source 22 is discussed in greater detail below.

In one preferred embodiment, the LEDs 24 may be of the multicolor variety having all three primary colors as separate channels in a single package (i.e., triluminary LEDs). Any desired color output may then be obtained by suitably choosing the current to each of the LED channels such that the LED 24 provides the admixture of primary colors appropriate to produce the perception of the desired output color. In other words, by varying these intensities individually any color in the rainbow may be produced. Preferably, the electronic controller 40 is connected in electric communication between the LED 24 and the battery/electrical power source 28. The control mechanism 40 may have a direct user interface (i.e., be positioned in the vehicle to be directly user accessible), have a remote user interface (i.e., be in remote communication with the user via a remote control), or both.

Light emitting diodes also respond rapidly to changes in current. This characteristic allows them to be pulsed at high speed. A variety of interesting optical phenomena result from viewing reflective objects with varying intensity or pulsed light. In particular, if the light intensity changes rapidly or "flickers," the illusion of flames may be greatly enhanced. This principle may be applied to the present invention by programming microcontroller 40 to "flicker" the LEDs 24. By connecting a very simple electronic circuit to the LEDs 24, the light output therefrom can made to randomly vary in intensity, producing aesthetically pleasing visual effects, including the above described flickering flame effect on the streamers 18.

The power source 28 is preferably a the vehicle's battery or electrical system, but may be a designated battery of the rechargeable variety, such as nickel cadmium alloy or the like. Alternately, the power source 28 may be an alternate DC power source, such as a magnetic induction electrical generator of the type using a stationary magnet and a moving magnet repeatedly passing close to the stationary magnet to induce electrical current in a coil or wire.

In operation, actuation of the air pressure source 32 produces sufficient airflow through the tube 12 to blow the streamers 18 into the transparent portion. The airflow extends the streamers 18, while the turbulence of the airflow continuously waves the streamers 18. Actuation of the lighting assembly 22 shines high-intensity light onto the waving streamers 18, producing the illusion of an open flame visible through the transparent portion 16, completing the illusion that flames are emerging from the tailpipe-like opaque portion 14. Variations in the air flow and lighting such as may be controlled by an electronic controller 40 connected between the power source and the respective air pressure source 32 and the lighting assembly 22 may enhance the illusion of flame emission.

Figure 8:
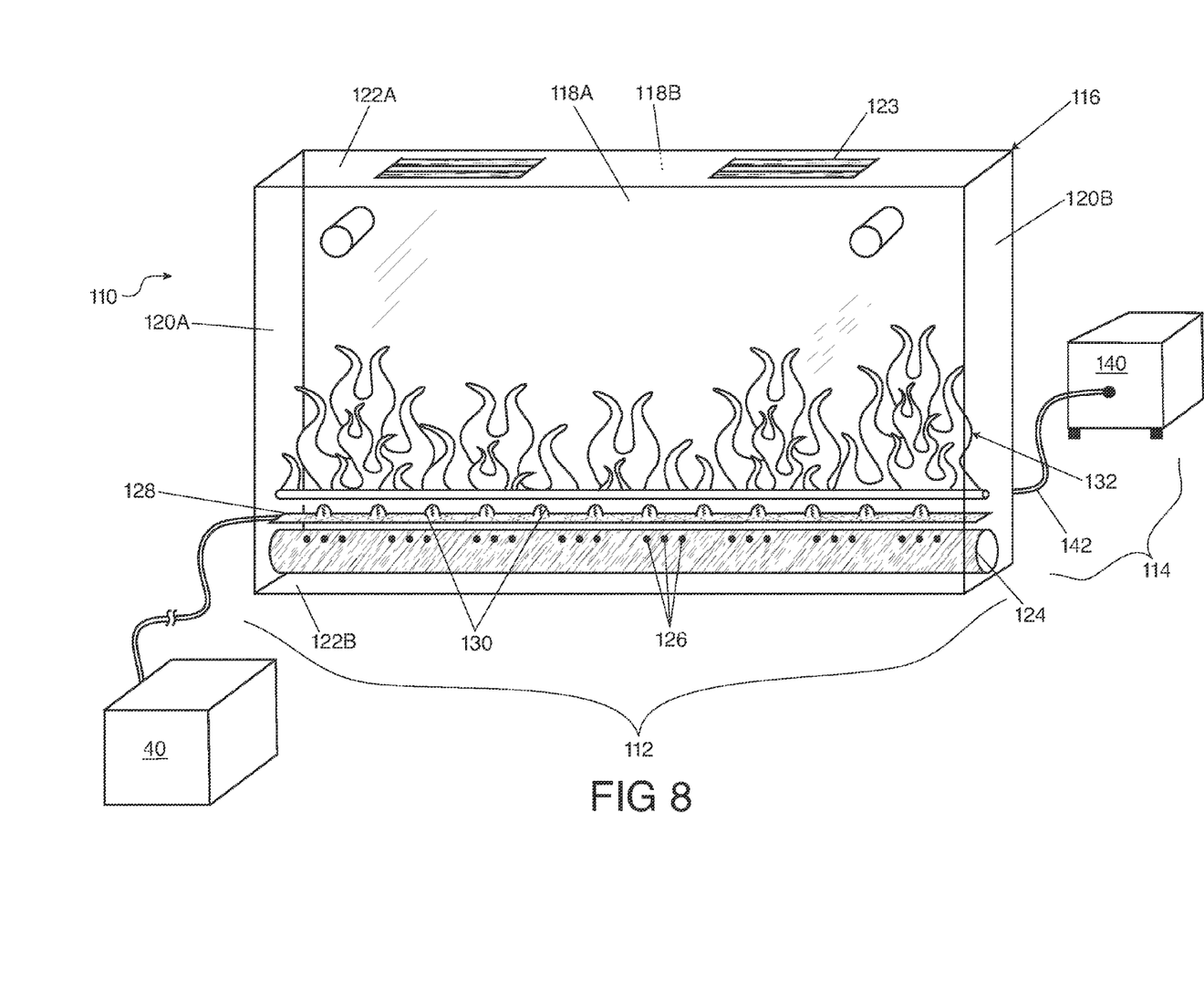
FIG. 8 is a perspective cutaway view of a third embodiment of the present invention, a vehicular lighting assembly for simulating the appearance of flames emerging around a license plate.
Figure 9:
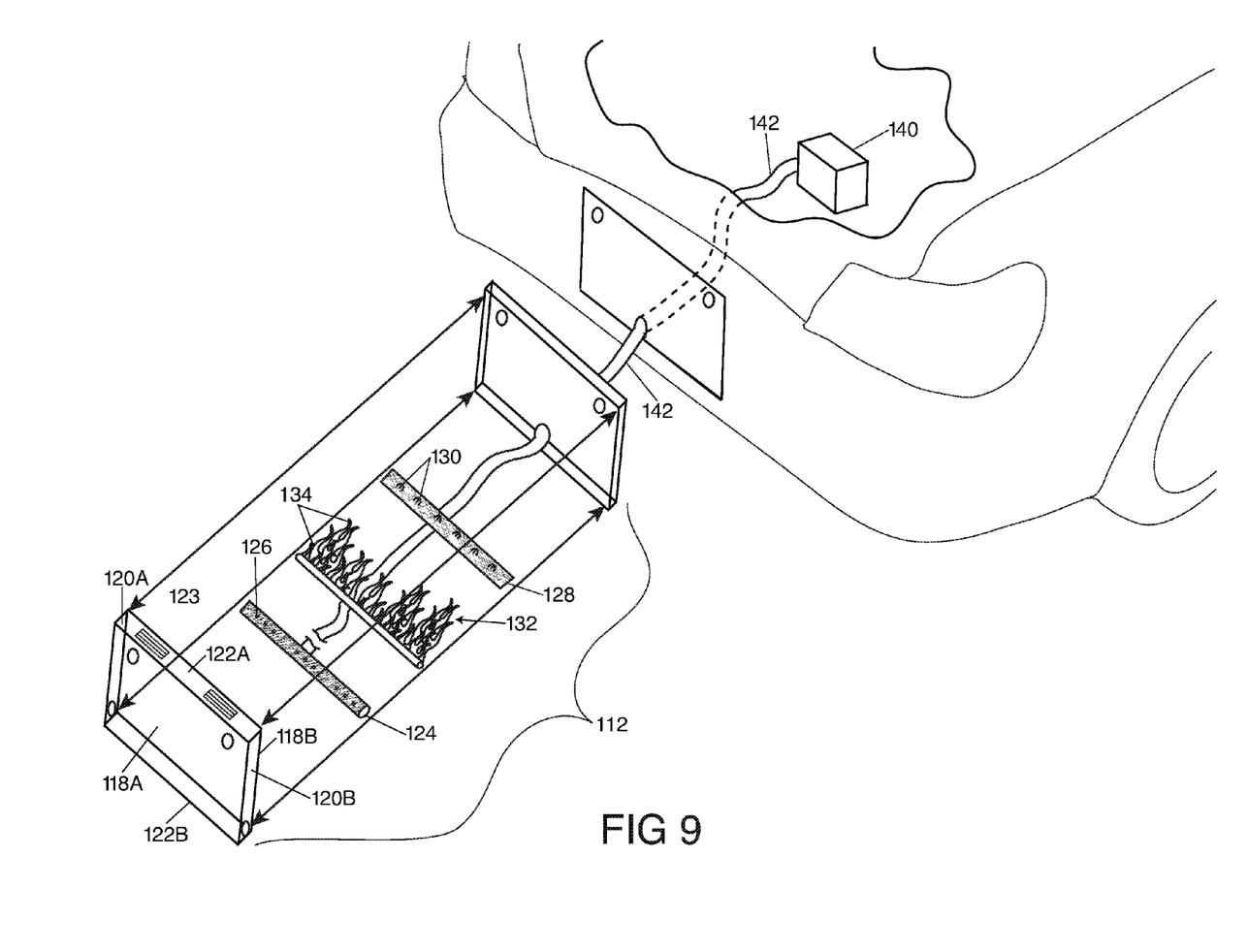
FIG. 9 is a perspective exploded view of FIG. 8 as connected to an automobile.

FIGS. 8-9 relate to a second embodiment of the present invention, a decorative license plate cover assembly 110 for use with a vehicle 5 to simulate the appearance of flames flickering around the license plate numbers. The assembly 110 includes a frame portion 112 pneumatically connected to an air flow source 114. The frame portion further 112 includes a generally rectangular substantially transparent housing 116 characterized by substantially transparent generally parallel front and back panels 118A, 118B connected by oppositely disposed generally parallel side panels 120A, 120B and by oppositely disposed generally parallel top and bottom panels 122A, 122B. Preferably, vents 123 are formed in the housing 116, more preferably in the top panel 122A.

An air distribution manifold 124 is mounted in the housing 116, preferably adjacent the bottom panel 122B. The air manifold 124 is preferably an elongated tube having a plurality of apertures 126 formed through the top for directing an upward flow of air substantially evenly through the housing 116. An array 128 of LEDs 130 is also mounted in the housing 116 and preferably disposed adjacent the air manifold 124. An array 132 of streamers 134 is also mounted within the housing 116 above the air manifold 124. The streamers 134 are preferably formed of a light, reflective flexible material and are more preferably shaped like tongues of flame. The streamers 134 may be tinted or may be silvered. The streamers 134 are preferably of lengths such that the longer streamers 134 may appear to extend up and around the license numbers while the shorter streamers extend to just below the license numbers.

The air flow source 114 preferably includes a fan or air pump 140 that is more preferably disposed in the trunk of the vehicle 5 and connected in pneumatic communication with the air manifold 124. Alternately, the fan/air pump 140 may also be mounted under the vehicle 5 or, connected directly to the frame portion 112. For fans/air pumps 140 not connected directly to the frame portion 112, a pneumatic hose 142 extends between the air manifold 124 and the fan/air pump 140.

The LED array 128 is connected in electric communication to the electrical power source 28, either directly and controlled through a switch, or (preferably) through an electronic controller 40. Preferably, there are a number of different colored LEDs 130 in the array 128, with red, orange, yellow and, to a lesser extent, blue, being well represented. More preferably, each LED 130 is in individual electric communication with the electronic controller 40 such that the intensity and frequency of activation/deactivation (i.e., flashing or flickering) of each LED 130 may be individually controlled to produce the desired output pattern of the array 128.

In operation, the housing 116 is affixed to the vehicle 5 adjacent and covering the license plate. When the air pump 140 is actuated, air flows through the manifold 124 to extend the streamers 134 up and around the license numbers. Turbulance in the air flow causes the streamers 134 to wave and move similar to flames. Energization of the LED array 128 shines colored light onto the streamers 134, completing the illusion that the streamers 134 are flames flickering around the license plate numbers.

Figure 10:
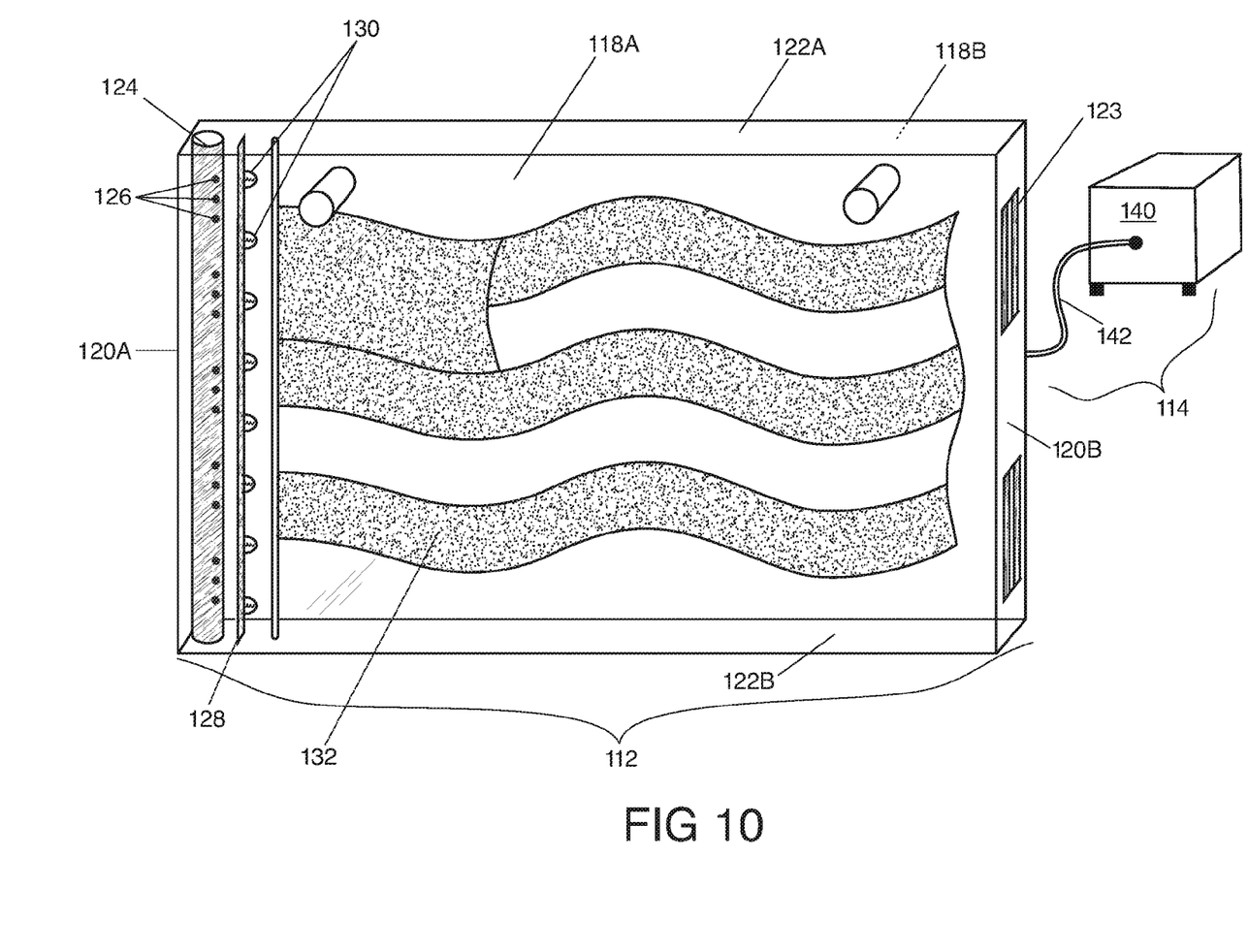
FIG. 10 is a perspective view of the embodiment of FIG. 8 showing a waving flag.

FIG. 10 illustrates and alternate embodiment of the above-described embodiment of FIGS. 8 and 9. The embodiment of FIG. 10 is identical to that of FIGS. 8 and 9, with the exceptions that the air manifold 124, LED array 128, and streamer array 132 are mounted adjacent a side panel 120A. In this example, the streamer array 132 emulates an American flag, and actuation of the air pump 140 causes the flag 132 to wave.

What is claimed is:

1. A license plate assembly comprising:
   a partially transparent housing connected over the license plate of the vehicle;
   a light-emitting array positioned within the housing; at least one reflective streamer mounted within the housing;
   an air pressure source operationally connected to the housing; a power source electrically connected to the light emitting array; and
   an electronic controller operationally connected to the light-emitting array;
   wherein actuation of the air pressure source wavingly extends the at least one streamer within the housing;
   wherein the light emitting array is positioned to shine light onto the waving at least one streamer; and
   wherein the electronic controller is operable to sequence the actuation of the light-emitting array.

2. The assembly of claim 1 wherein the electronic controller is further adapted to receive a control signal; wherein the light emitting array has a first light emitting state and a second light emitting state; and wherein receipt of the control signal by the relay actuates a changing of the state of the light emitting array.

3. The assembly of claim 1 wherein the light-emitting array includes a plurality of triluminary diodes.

4. The assembly of claim 1 wherein the electronic controller may actuate the light-emitting array to provide a plurality of colors.

5. The assembly of claim 1 wherein the electronic controller is operable to flash the light-emitting array at a predetermined pulsation rate.

6. The assembly of claim 1 wherein the electronic controller is operable to flash the light-emitting array in a predetermined pulsation pattern.

7. The assembly of claim 1 wherein the at least one reflective streamer is a flag.

\* \* \* \* \*